A. L. TOMBELAINE.
MINER'S LAMP.
APPLICATION FILED DEC. 15, 1911.

1,055,001.

Patented Mar. 4, 1913.

Witnesses.

Inventor.
Alexander L. Tombelaine

UNITED STATES PATENT OFFICE.

ALEXANDRE LÉONARD TOMBELAINE, OF VILLANUOVA-MINAS, SPAIN.

MINER'S LAMP.

1,055,001.   Specification of Letters Patent.   Patented Mar. 4, 1913.

Application filed December 15, 1911. Serial No. 665,884.

*To all whom it may concern:*

Be it known that I, ALEXANDRE LÉONARD TOMBELAINE, a citizen of the French Republic, residing at Villanuova-Minas, in Spain, have invented certain new and useful Improvements in Miners' Lamps; and I do hereby declare the following to be a full, clear, and exact description of the invention, such as will enable others skilled in the art to which it appertains to make and use the same.

The present invention relates to an improved safety acetylene lamp for miners.

The lamp comprises a gas generator in combination with rigid screens which are formed by providing on the interior and exterior of a cylinder grooves which by their intersection form apertures serving for the passage of the gases.

Figure 1:
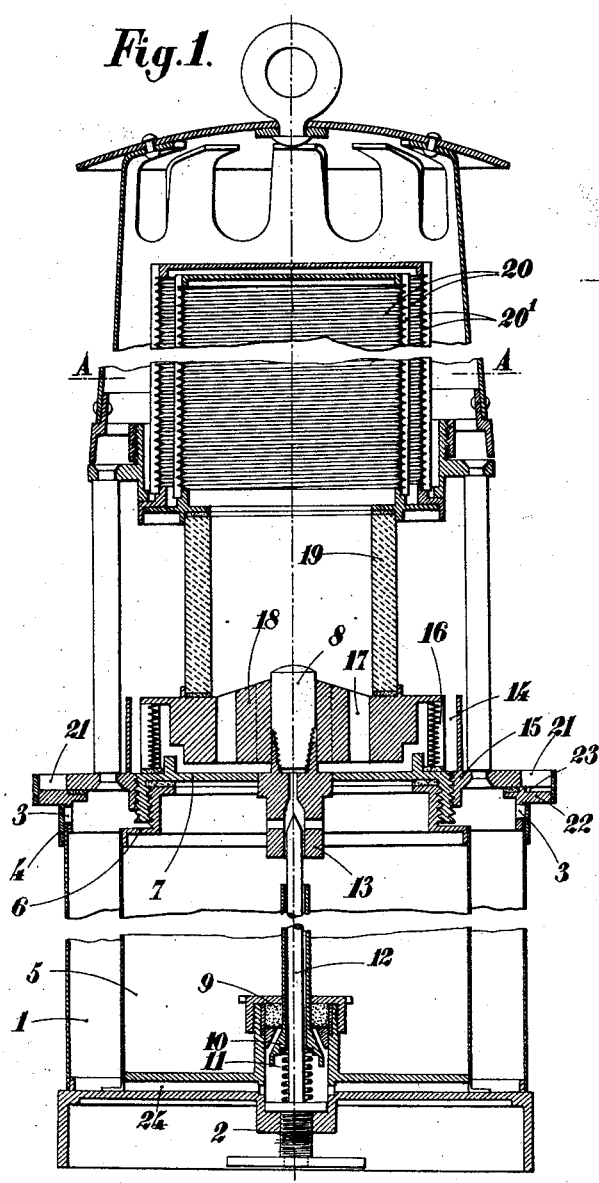
Figure 2:
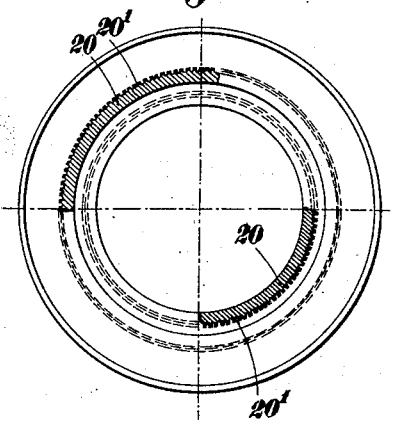

In the accompanying drawing:—Figure 1 shows the lamp in axial section. Fig. 2 is a section on the line A—A in Fig. 1.

The gas generator consists of two receptacles 1 and 5 which are cylindrical and concentric. The receptacle 1 holds the water and the receptacle 5, the calcium carbid.

The water reservoir 1 is provided at its lower part with a threaded plug 2 and at its upper part with openings 3 used for charging it with water by immersion; the said openings being covered by a leather band 4. The receptacle containing the calcium carbid has a threaded ring 6 fixed to its upper part and can be closed hermetically by the cover 7. A conical valve 10 is fixed in the center of the bottom of tank 5, said valve being provided with a spring 11 and a felt washer 9.

A rod 12 carried by the plug 2 passes through the valve and projects into the valve casing 13 upon which the burner 8 is mounted. The air enters the interior of the lamp through an annular space 14 formed by the outer crown 15, which screws on the cover 7, and the inner crown 16. The latter crown is provided on its interior and exterior with grooves which by their intersection form apertures for the admission of air. This air moves along the cover 7 and then ascends through a series of vertical openings 17 bored in a burner plate 18 which surrounds the burner 8. The crown 16 is rigid and of an unchangeable shape; it does not overheat owing to its thickness and the large cooling surface caused by the grooves. Further, it is subjected to but little wear and its efficiency as regards the passage of the flame is far greater than that afforded by the ordinary wire gauze. The plate 18 also has a large cooling surface. The apertures 17 insure safety and they efficiently reduce the action which currents of air, traveling at a high velocity, have on the flame. The flame is surrounded by a glass chimney 19 inside which a thin mica chimney (not shown) can be so arranged as to prevent the breakage of the glass cylinder. The volume of the combustion chamber has been reduced to a minimum and thus a perfectly safe device is obtained. Two sleeves 20, mounted on top of the glass chimney 19, are constructed in a similar way to that of crown 16. They are made up by metal cylinders in the two walls of which grooves are formed. For example, helicoidal grooves 20 are cut on the inner side and vertical grooves such as $20^1$ are cut on the outer side; the intersections of these grooves form a large number of small openings. The path followed by the grooves may vary, it may be circular, rectilinear, helicoidal and so forth. The security afforded by a single screen of this kind is much greater than in the case with two ordinary gauze screens. In the example illustrated in Fig. 1 two screens are arranged in such a manner as to permit the lighting by an electric spark without the passage of the flame through a 10% gaseous mixture of air and acetylene, that is to say, with the maximum explosibility and speed of propagation.

The lamp works in the following manner: The calcium carbid is placed in the receptacle 5; by immersing the receptacle 1 as far as the openings 3. The part between 1 and 5 is filled with water which passing through the openings 24 fills the felt washer. The passage of water can be regulated by means of the plug 2 and spring 11 of the conical valve 10. The regulation of the flame, so as to obtain a small flame necessary for detecting firedamp, can be effected without difficulty, this adjustment being done by means of a pin 12 which passes through the guide valve 10. The felt washer 9 is made of such dimensions that when the valve 10 is fully opened the flame does not exceed the normal intensity. On turning the plug 2, the spring 11 is tightened and in its turn presses the valve 10 until the orifice admitting water to the felt is completely closed, but, as moisture is retained in the carbid, a few seconds will elapse before the flame is lowered thus constituting an inconvenience for detecting firedamp at a given moment. In order to obviate this inconvenience it is only necessary to continue to turn the plug 2, which, after having closed the valve 10 causes the pin 12 to enter the recess 13, interrupt the discharge of gas through the burner and gradually reduces the flame. Although the admission of water is intercepted by the valve 10, a small quantity of gas continues to form owing to the moisture of the carbid. In order to avoid an increase of pressure in the inner receptacle, the valve 10 is arranged in such a manner that it can rise slightly from its seat and permit the passage of the slight excess of gas which then issues through the apertures 3 in lifting the leather band 4, which acts as a safety valve. It should be noted that with the normal light, the plug 2 is hardly used; the gas regulates the admission of the water by its own pressure inside the carbid receptacle. The regulating pin and the spring are employed particularly for detecting firedamp and for extinguishing the lamp instantaneously. To prevent the miner tampering with the working parts of the lamp, the upper crown 15 has a series of apertures 21 perforated along its periphery and when screwed home one of these apertures will coincide with a recess 23 made in the lower crown 22. When this is done molten lead or any other metal can be poured in and make the locking secure. This seal can be afterward broken or remelted by some appropriate tool.

I claim:—

1. In a miner's lamp, a screen comprising a rigid member provided with apertures formed by the intersection of interior and exterior grooves in said member.

2. In a miner's lamp, a screen comprising a rigid member provided with apertures formed by interior and exterior grooves intersecting substantially at right angles to each other.

3. In a miner's lamp, a screen comprising a suitably shaped member provided with apertures formed by the intersection of grooves on the interior and exterior faces of said member.

4. A screen for miners' lamps and the like, comprising an annular sleeve-like member provided with apertures formed by the intersection of substantially circumferential grooves on one face of said member and substantially axial grooves on the other face thereof.

5. In a miner's lamp, a sleeve-like screen provided with apertures formed by the intersection of interior and exterior grooves, and a burner plate forming a closure to said sleeve-like screen, said burner plate provided with openings for the passage therethrough of the air admitted through the screen.

6. In a miner's lamp, a screen the apertures of which are formed by the intersection of interior and exterior sets of grooves or recesses, the grooves of one set being substantially axial and the grooves of the other set being circumferential.

In testimony whereof I affix my signature, in presence of two witnesses.

ALEXANDRE LÉONARD TOMBELAINE.

Witnesses:
  A. WILLOX,
  C. DU PÉRIER DE LARSAN.

---

Copies of this patent may be obtained for five cents each, by addressing the "Commissioner of Patents, Washington, D. C."